United States Patent
Steinkamp et al.

(10) Patent No.: US 8,452,645 B2
(45) Date of Patent: May 28, 2013

(54) INTERFACE BETWEEN TWO REWARD PROGRAMS FOR CONCURRENTLY REDEEMING CURRENCIES

(75) Inventors: Ronald Steinkamp, Ballwin, MO (US); Darlene Wehner, Festus, MO (US)

(73) Assignee: Maritz Holdings Inc., Fenton, MO (US)

( * ) Notice: Subject to any disclaimer, the term of this patent is extended or adjusted under 35 U.S.C. 154(b) by 942 days.

(21) Appl. No.: 12/021,866

(22) Filed: Jan. 29, 2008

(65) Prior Publication Data

US 2009/0192890 A1    Jul. 30, 2009

(51) Int. Cl.
*G06Q 40/00*    (2012.01)
(52) U.S. Cl.
USPC ...... 705/14; 705/26.1; 705/14.27; 705/14.17; 705/14.38; 705/16; 705/25; 463/25; 463/42
(58) Field of Classification Search
USPC ................. 705/26.1, 14.27, 14.38, 14.17, 16, 705/25; 463/25, 42
See application file for complete search history.

(56) References Cited

U.S. PATENT DOCUMENTS

| | | | |
|---|---|---|---|
| 6,721,743 B1 * | 4/2004 | Sakakibara ..................... | 1/1 |
| 7,013,357 B2 | 3/2006 | Murdock et al. | |
| 7,152,042 B1 | 12/2006 | Arkes | |
| 7,398,225 B2 * | 7/2008 | Voltmer et al. ............. | 705/14.27 |
| 7,562,810 B2 * | 7/2009 | Rao et al. ..................... | 235/375 |
| 7,613,629 B2 * | 11/2009 | Antonucci et al. ......... | 705/14.27 |
| 2001/0054003 A1 | 12/2001 | Chien et al. | |
| 2002/0055874 A1 * | 5/2002 | Cohen ........................ | 705/14 |
| 2002/0059103 A1 * | 5/2002 | Anderson et al. ........... | 705/14 |
| 2002/0077890 A1 | 6/2002 | LaPointe et al. | |
| 2002/0143614 A1 * | 10/2002 | MacLean et al. ............. | 705/14 |
| 2003/0032474 A1 | 2/2003 | Kaminkow | |
| 2003/0036425 A1 | 2/2003 | Kaminkow et al. | |
| 2005/0021399 A1 | 1/2005 | Postrel | |
| 2005/0021400 A1 * | 1/2005 | Postrel ........................ | 705/14 |
| 2005/0021401 A1 | 1/2005 | Postrel | |
| 2005/0060455 A1 | 3/2005 | Murdock et al. | |
| 2005/0149394 A1 | 7/2005 | Postrel | |
| 2005/0197904 A1 * | 9/2005 | Baron et al. ................. | 705/14 |
| 2005/0267800 A1 * | 12/2005 | Tietzen et al. ............... | 705/14 |
| 2005/0288998 A1 * | 12/2005 | Verma et al. ................. | 705/14 |
| 2006/0004629 A1 | 1/2006 | Neemann et al. | |
| 2006/0089874 A1 * | 4/2006 | Newman et al. ............. | 705/14 |
| 2006/0248007 A1 * | 11/2006 | Hofer et al. ................. | 705/40 |
| 2006/0259362 A1 * | 11/2006 | Cates ........................... | 705/14 |
| 2006/0259364 A1 * | 11/2006 | Strock et al. ................ | 705/14 |
| 2007/0038515 A1 | 2/2007 | Postrel | |
| 2007/0078719 A1 * | 4/2007 | Schmitt et al. .............. | 705/14 |
| 2008/0201224 A1 * | 8/2008 | Owens et al. ............... | 705/14 |
| 2009/0124384 A1 * | 5/2009 | Smith et al. ................. | 463/42 |

OTHER PUBLICATIONS

American Express has added Virgin Atlantic and Hawaiian Airlines to its Flight Finder feature under its Membership Rewards program. ( Loyalty Programs ); Business Traveler , v 21 , n. 1 , p. 26; Dec. 2007.*
EDebitPay Rewards: BSP to provide custom rewards-mall for EDP; Business Wire , p NA; Jan. 7, 2008.*

* cited by examiner

*Primary Examiner* — Tien Nguyen
(74) *Attorney, Agent, or Firm* — Senniger Powers LLP (57) ABSTRACT

A system and method, such as an interface, for real time redemption of currency of two or more reward programs. The interface allows a participant to redeem in real time currency of one program in which a participant has an account with currency of one or more other programs in which the participant also has an account. Thus, the participant can selectively use in real time the currencies from two or more programs for redemption via one of the programs.

7 Claims, 5 Drawing Sheets

INTERFACE BETWEEN TWO REWARD PROGRAMS FOR CONCURRENTLY REDEEMING CURRENCIES

FIELD OF THE INVENTION

The present invention generally relates to an interface for real time redemption of currency of a plurality of reward programs and, in particular, a system and method which redeems in real time currency from one reward program in which a participant has an account concurrently with currency from another reward program in which the participant has an account so that the participant can use in real time part or all of the currencies from the two programs for redemption.

BACKGROUND OF THE INVENTION

Systems for electronic barter, trading and redeeming points accumulated in reward programs allow participants to use their points in various, flexible ways. For example, some prior art systems and methods suggest accumulating reward points so that the accumulated points can be used to purchase an award. A participant earns reward points from a plurality of independent reward points issuing entities (such as a frequent flyer account or a credit card loyalty account). On request by the participant, a trading server accumulates a user designated amount of the user's earned reward points from the reward servers and credits the accumulated points into a single reward exchange account associated with the user. The user may then select an item for purchase with the accumulated reward points.

Thus, in such systems the participant may accumulate points from various programs via a trading server so that the points may be redeemed. In general, such systems tend to be one way systems. Once points are transferred to the trading server from a particular program, the points cannot be returned or used in the particular program. Also, such systems require the participant to pre-select the amount of points to be transferred in advance of a redemption transaction and not as part of a redemption transaction. Also, the value of transferred points depends on the trading server.

SUMMARY OF THE INVENTION

An interface in the form of a system or method consolidates currency between two or more reward programs for redemption. The interface allows a participant to redeem in real time currency of programs in which a participant has accounts. Thus, the participant can selectively use in real time the currencies from two or more programs for a redemption transaction via one of the programs.

Other objects and features will be in part apparent and in part pointed out hereinafter.

BRIEF DESCRIPTION OF THE DRAWINGS AND TABLES

TABLE 1 illustrates the steps involved in the exchange of information in a redemption transaction according to one embodiment of the invention wherein at least some currency from program #2 is redeemed in real time with currency from program #1 to pay for a redemption transaction within program #1.

TABLE 2 illustrates the steps of TABLE 1 which only involve program #1. TABLE 2 illustrates the exchange of information in a redemption process from the perspective of program #1 according to one embodiment of the invention.

TABLE 3 illustrates the steps of TABLE 1 which only involve the interface. TABLE 3 illustrates the exchange of information in a redemption process from the perspective of the interface according to one embodiment of the invention.

TABLE 4 illustrates the steps of TABLE 1 which only involve program #2. TABLE 4 illustrates the exchange of information in a redemption process from the perspective of program #2 according to one embodiment of the invention.

Corresponding reference characters indicate corresponding parts throughout the drawings.

DESCRIPTION OF THE EMBODIMENTS

Figure 1:
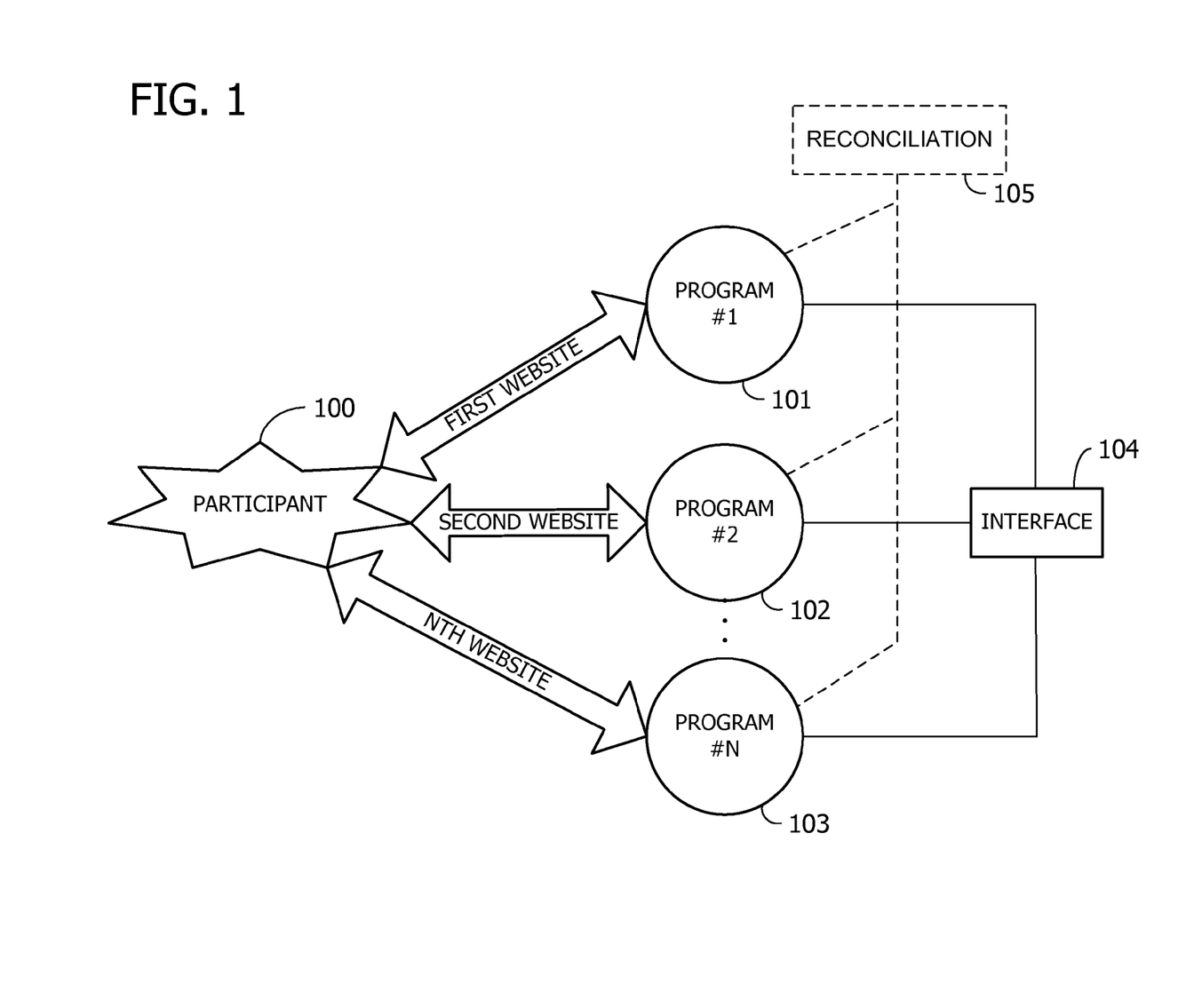
FIG. 1 is a block diagram of N programs and an interface according to one embodiment of the invention for linking the N programs.

Referring to FIG. 1, a block diagram of N programs and an interface according to one embodiment of the invention for linking the N programs is illustrated. Frequently, a participant is a member of more than one program. For example, a salesperson may be a member of several reward programs and several incentive programs. The incentive program may be offered by different manufacturers to encourage the salesperson to sell the manufacturer's products. The incentive programs may be offered by the employer or various distributors which supply the employer, to encourage certain conduct of the salesperson.

From time to time, a participant 100 may want to consolidate for redemption currency between two or more independent and distinct programs, such as a first program 101, a second program 102 and an Nth program 103. An interface 104 allows a participant 100 to redeem in real time first currency of the first program 101 in which a participant has an account with second currency of the second program 102 in which the participant also has an account. Thus, the participant can use in real time the currencies from the two programs for redemption. In particular, the invention includes a system and method which consolidates for redemption in real time a participant's currency from two or more programs so that the participant can redeem the currencies via one of the programs as part of a redemption transaction to purchase a reward. In one embodiment, it is contemplated that the participant 100 can enter any one program 101, 102 or 103, and via the entered program and the interface 104, the participant 100 selects points from any other programs for use in a redemption transaction.

Figure 2:
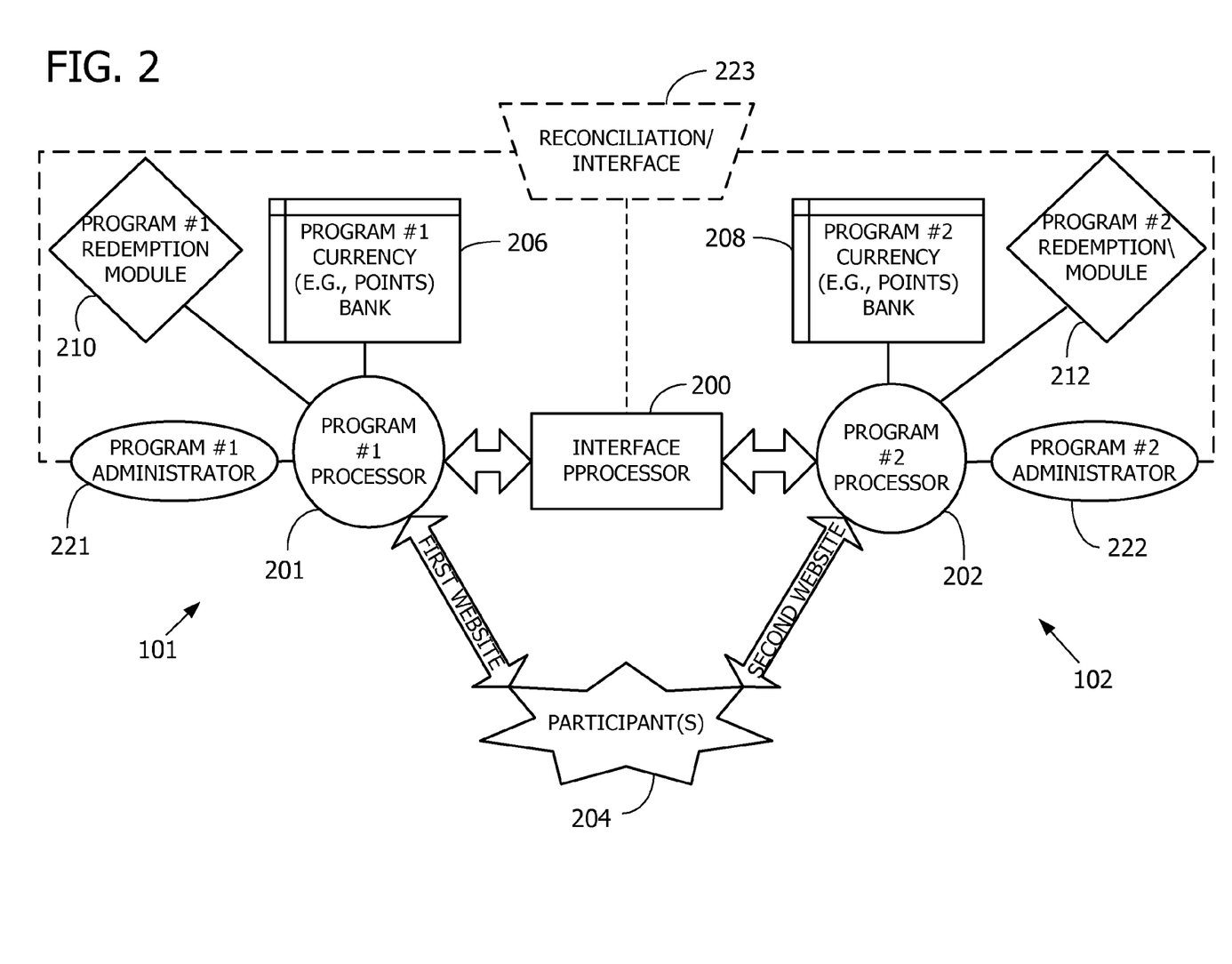
FIG. 2 is a block diagram of two programs and an interface according to one embodiment of the invention for linking the two programs.

Referring to FIG. 2, in general, one embodiment of the present invention is an interface 200 for real time consolidation for redemption of currency between two programs, such as the first reward program 101 and the second reward program 102. Each of the programs includes a processor 201, 202 accessible by a participant 204 via a website. Each program processor 201, 202 administers its program as directed by a program administrator 221, 221, respectively. Each program processor 201, 202 maintains a storage bank 206, 208 identifying the amount of currency (e.g., points) the participant 204 accumulates or earns in each respective program. Each program 201, 202 also includes a redemption module 210, 212 which permits the participant to redeem the currency.

In one embodiment, at regular intervals, the administrator 221 of the first program 101 and the administrator 222 of the second program 102 would reconcile the exchange of currency that occurred during the interval. As an example, assume that the currencies are points and that the points of the first program 101 had a negotiated value of twice as much as the points of the second program 102. Further, assume during a one-month period 1000 points from the second program 102 were redeemed by the first program 101 and that 600 points from the first program 101 were redeemed by the second program 102. In reconciling, the second administrator 122 would compensate the first administrator 101 for the difference 100 points from the first program 101. It is also contemplated as an alternative that a reconciliation/interface 223 (see below) could manage the reconciliation.

The interface processor 200 allows the participant 204 to consolidate for redemption in real time first currency stored in bank 206 of the first program 101 in which a participant has an account with second currency stored in bank 208 of the second program 102 in which the participant also has an account. Thus, the participant 204 can use in real time the currencies from the two programs 201, 202 for redemption. In particular, the invention includes a system and method which consolidates for redemption in real time currency from two or more reward programs. After points are used in real time and redeemed, the program administrators 221, 222 or the optional reconciliation interface 223 reconciles the redemption of points from one program to another.

In one form, the reconciliation interface 223 would be programmed with a relative value for the points, with an exchange rate and with a value for the points. For example, suppose program #2 points are worth two (2) cents each, which is twice as much as program #1 points, which are worth one (1) cent each. The exchange rate would be two (2) program #1 points for one (1) program #2 point. As a first specific example, assume over a period of time that 100 points of program #2 are redeemed by program #1 and 200 points of program #1 are redeemed by program #2. In this first specific example, the reconciliation interface 223 would balance out the redeemed points. As a second specific example, assume over a period of time that 200 points of program #2 are redeemed by program #1 and 200 points of program #1 are redeemed by program #2. In this second specific example, the reconciliation interface 223 would charge program #1 for $2.00 (100 points of program #2). As a third specific example, assume over a period of time that 100 points of program #2 are redeemed by program #1 and 300 points of program #1 are redeemed by program #2. In this second specific example, the reconciliation interface 223 would charge program #2 for $1.00 (100 points of program #1).

As used herein, a reward award program may be any reward plan or policy used to encourage or incentive the participant, the participant's performance, the participant's use of particular merchants which sell goods and/or services, or a combination of these. Frequently, such reward programs are also referred to as incentive, loyalty, frequency, affinity, retention, or performance improvement programs. This is because such programs encourage, reward or improve participant loyalty, affinity, retention, quality of performance or frequency of performance or create incentives. The reward program permits the participants to redeem currency (e.g., points, dollars, other legal tender, and representative equity) obtain as a motivational award products and/or services from merchants.

In one form, the interface 200 may use in real time points by adding points from one program to points of another program when the points have the same relative value. In another form, the interface 200 may use in real time points by first converting points from one program to points of another program if the points do not have the same relative value, and then adding the points. In the above example where program #2 points are worth twice as much as program #1 points, when program #2 points are redeemed by program #1, the program #2 points would be doubled and added to program #1 points. Similarly, in the above example where program #2 points are worth twice as much as program #1 points, when program #1 points are redeemed by program #2, the program #1 points would be halved and added to program #2 points.

Figure 3:
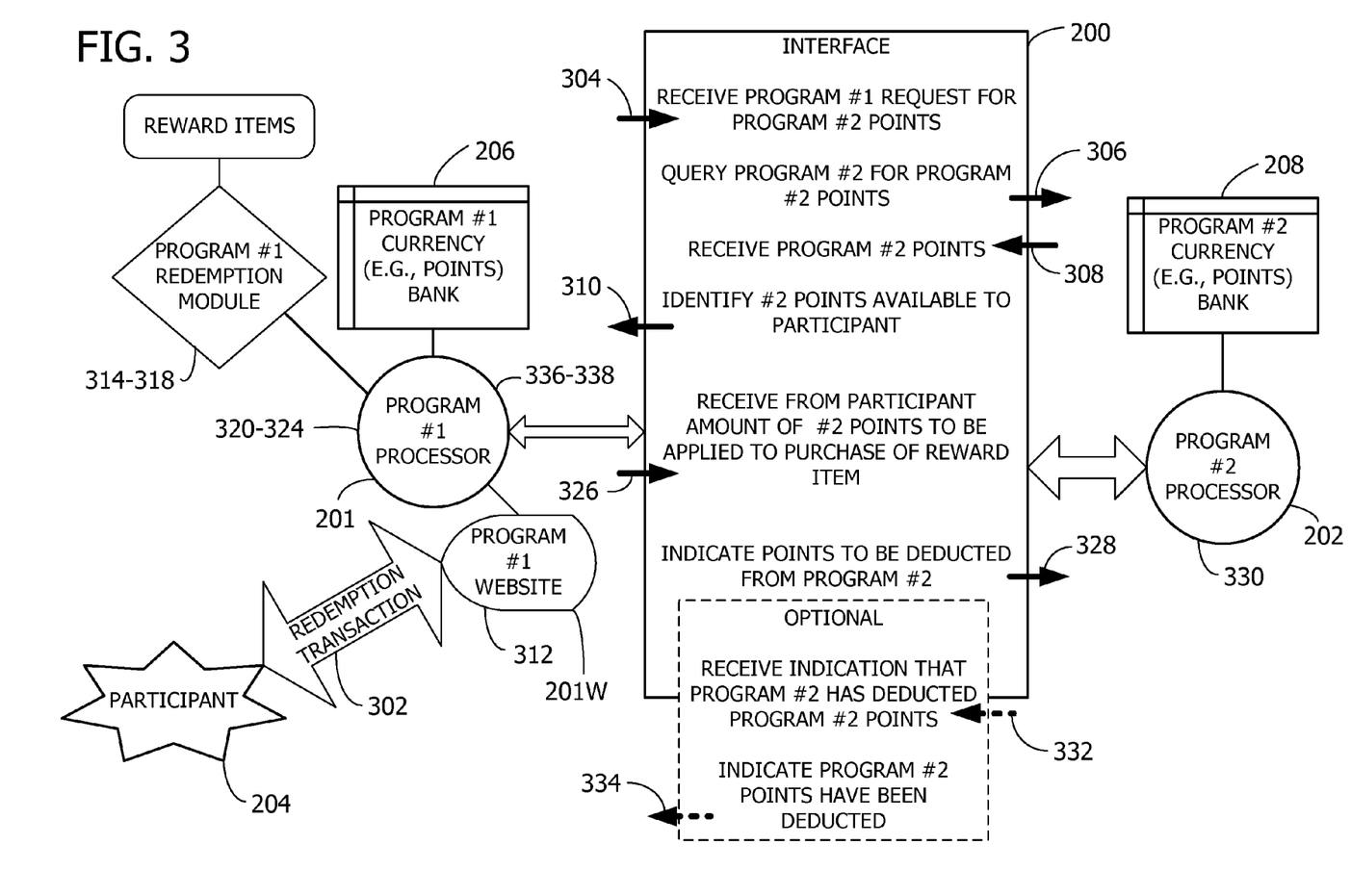
FIG. 3 is a diagram of a redemption transaction in which a participant of program #1 redeems currency from the program #1 and currency from program #2 via the interface according to one embodiment of the invention. The reference characters of FIG. 3 correspond to the steps noted in TABLES 1-4.

Referring to FIG. 3, the following TABLE 1 illustrates the redemption transactions that are involved in the exchange of information between the first program 201, the interface 200 and the second program 202 in order to consolidate for redemption currencies of the second program 202 into the first program 201. TABLE 1 illustrates the transfer of information involved in a redemption transaction according to one embodiment of the invention wherein at least some currency from program #2 is redeemed in real time with currency from program #1 to pay for a redemption transaction within program #1.

TABLE 1

ALL INFORMATION TRANSACTIONS:

| STEP | SYSTEM(S) INVOLVED | ACTION(S) |
| --- | --- | --- |
| 302 | PROGRAM #1 201 | PARTICIPANT 204 ACCESSES PROGRAM #1 201 VIA THE FIRST WEBSITE 201W |
| 304 | PROGRAM #1 PROCESSOR 201 TO INTERFACE 200 | CALL IS INVOKED FROM PROGRAM #1 PROCESSOR 201 TO THE INTERFACE 200 TO RETRIEVE PARTICIPANT'S PROGRAM #2 POINT TOTAL FOR DISPLAY ON THE FIRST WEBSITE 201W |
| 306 | INTERFACE 200 TO PROGRAM #2 PROCESSOR 202 | INTERFACE 200 QUERIES PROGRAM #2 PROCESSOR 202 FOR PROGRAM #2 POINT TOTAL OF PARTICIPANT 204 IN BANK 208 |
| 308 | PROGRAM #2 PROCESSOR 202 TO INTERFACE 200 | PROGRAM #2 PROCESSOR 202 ADVISES INTERFACE 200 OF PROGRAM #2 POINT TOTAL OF PARTICIPANT 204 |
| 310 | INTERFACE 200 TO PROGRAM #1 PROCESSOR 201 | INTERFACE 200 PROVIDES PROGRAM #2 POINT TOTAL OF PARTICIPANT 204 TO PROGRAM #1 PROCESSOR 201 |

TABLE 1-continued

| | | ALL INFORMATION TRANSACTIONS: |
|---|---|---|
| STEP | SYSTEM(S) INVOLVED | ACTION(S) |
| 312 | PROGRAM #1 PROCESSOR 201 | FIRST WEBSITE 201W DISPLAYS PROGRAM #1 POINT TOTAL AND PROGRAM #2 POINT TOTAL |
| 314 | PROGRAM #1 PROCESSOR 201 | PARTICIPANT 204 SHOPS SELECTED CATEGOIES AND ITEMS OF THE PROGRAM #1 |
| 316 | PROGRAM #1 PROCESSOR 201 | PARTICIPANT VIEWS ITEM DETAILS AND THE OPTION TO ADD ITEMS TO SHOPPING CART |
| 318 | PROGRAM #1 PROCESSOR 201 | SHOPPING CART IS DISPLAYED WITH ITEM(S) SELECTED PLUS POTENTIAL CROSS-SELLING ITEM(S) |
| 320 | PROGRAM #1 PROCESSOR 201 | PARTICIPANT 204 SELECTS REDEMPTION AMOUNT FROM PROGRAM #1 POINTS AND PROGRAM #2 POINTS |
| 322 | PROGRAM #1 PROCESSOR 201 | PROGRAM #1 PROCESSOR 201 DEDUCTS PROGRAM #1 POINTS REQUIRED FOR REDEMPTION TRANSACTION |
| 324 | PROGRAM #1 PROCESSOR 201 | PROGRAM #1 PROCESSOR 201 DETERMINES WHETHER PROGRAM #2 POINTS REQUIRED FOR REDEMPTION TRANSACTION? |
| 326 | PROGRAM #1 PROCESSOR 201 TO INTERFACE 200 | IF PROGRAM #2 POINTS NEEDED FOR REDEMPTION TRANSACTION, CALL IS INVOKED FROM PROGRAM #1 PROCESSOR 201 TO INTERFACE 200 TO DEDUCT PROGRAM #2 POINTS |
| 328 | INTERFACE 200 TO PROGRAM #2 PROCESSOR 202 | INTERFACE 200 INDICATES TO PROGRAM #2 PROCESSOR 202 PROGRAM #2 POINTS TO BE DEDUCTED |
| 330 | PROGRAM #2 PROCESSOR 202 | PROGRAM #2 PROCESSOR 202 DEDUCTS AMOUNT OF PROGRAM #2 POINTS USED FOR REDEMPTION TRANSACTION |
| 332 | PROGRAM #2 PROCESSOR 202 TO INTERFACE 200 (OPTIONAL) | PROGRAM #2 PROCESSOR 202 INDICATES TO INTERFACE 200 THAT AMOUNT OF PROGRAM #2 POINTS HAS BEEN DEDUCTED FROM PROGRAM #2 POINTS |
| 334 | INTERFACE 200 TO PROGRAM #1 PROCESSOR 201 (OPTIONAL) | INTERFACE 200 INDICATES TO PROGRAM #1 PROCESSOR 201 THAT PROGRAM #2 POINTS HAVE BEEN DEDUCTED |
| 336 | PROGRAM #1 PROCESSOR 201 | TRANSACTION COMPLETED |

Referring again to FIG. 3, the following TABLE 2 illustrates the transactions of TABLE 1 that involve only the first program 201 in the exchange of information between the first program 201 and the interface 200 in order to consolidate for redemption currencies from the second program 202 into the first program 201. TABLE 2 illustrates the steps of TABLE 1 which only involve program #1. TABLE 2 illustrates the transfer of information in a redemption process from the perspective of program #1 according to one embodiment of the invention.

TABLE 2

| | | INFORMATION TRANSACTIONS FROM PERSPECTIVE OF PROGRAM #1 PROCESSOR 201: |
|---|---|---|
| STEP | SYSTEM(S) INVOLVED | ACTION(S) |
| 302 | PROGRAM #1 PROCESSOR 201 | PARTICIPANT 204 ACCESSES PROGRAM #1 201 VIA THE FIRST WEBSITE 201W |
| 304 | PROGRAM #1 PROCESSOR 201 TO INTERFACE 200 | CALL IS INVOKED FROM PROGRAM #1 PROCESSOR 201 TO THE INTERFACE 200 TO RETRIEVE PARTICIPANT'S PROGRAM #2 POINT TOTAL FOR DISPLAY ON THE FIRST WEBSITE 201W |
| 310 | INTERFACE 200 TO PROGRAM #1 PROCESSOR 201 | INTERFACE 200 PROVIDES PROGRAM #2 POINT TOTAL OF PARTICIPANT 204 TO PROGRAM #1 PROCESSOR 201 |
| 312 | PROGRAM #1 PROCESSOR 201 | FIRST WEBSITE 201W DISPLAYS PROGRAM #1 POINT TOTAL AND PROGRAM #2 POINT TOTAL |
| 314 | PROGRAM #1 PROCESSOR 201 | PARTICIPANT 204 SHOPS SELECTED CATEGOIES AND ITEMS OF THE PROGRAM #1 |
| 316 | PROGRAM #1 PROCESSOR 201 | PARTICIPANT VIEWS ITEM DETAILS AND THE OPTION TO ADD ITEMS TO SHOPPING CART |
| 318 | PROGRAM #1 PROCESSOR 201 | SHOPPING CART IS DISPLAYED WITH ITEM(S) SELECTED PLUS POTENTIAL CROSS-SELLING ITEM(S) |
| 320 | PROGRAM #1 PROCESSOR 201 | PARTICIPANT 204 SELECTS REDEMPTION AMOUNT FROM PROGRAM #1 POINTS AND PROGRAM #2 POINTS |

TABLE 2-continued

INFORMATION TRANSACTIONS FROM PERSPECTIVE OF
PROGRAM #1 PROCESSOR 201:

| STEP | SYSTEM(S) INVOLVED | ACTION(S) |
|---|---|---|
| 322 | PROGRAM #1 PROCESSOR 201 | PROGRAM #1 PROCESSOR 201 DEDUCTS PROGRAM #1 POINTS REQUIRED FOR REDEMPTION TRANSACTION |
| 324 | PROGRAM #1 PROCESSOR 201 | PROGRAM #1 PROCESSOR 201 DETERMINES WHETHER PROGRAM #2 POINTS REQUIRED FOR REDEMPTION TRANSACTION? |
| 326 | PROGRAM #1 PROCESSOR 201 TO INTERFACE 200 | IF PROGRAM #2 POINTS NEEDED FOR REDEMPTION TRANSACTION, CALL IS INVOKED FROM PROGRAM #1 PROCESSOR 201 TO INTERFACE 200 TO DEDUCT PROGRAM #2 POINTS |
| 334 | INTERFACE 200 TO PROGRAM #1 PROCESSOR 201 (OPTIONAL) | INTERFACE 200 INDICATES TO PROGRAM #1 PROCESSOR 201 THAT PROGRAM #2 POINTS HAVE BEEN DEDUCTED |
| 336 | PROGRAM #1 PROCESSOR 201 | TRANSACTION COMPLETED |

Thus, from the perspective of the first program processor 201, the invention is one form is a system for a reward program. The first storage bank 206 stores accounts of participants 204 having first currency in the first reward program 101. The first redemption module 210 facilitates the redemption of the currency of the participants 204. The first program processor 201 administers the accounts in the first storage bank 206 including adding first currency to the accounts and subtracting redeemed first currency in response to redemption transactions implemented by the first redemption module 210. The first program processor 201 is linked (e.g., via interface 200) to the second reward program processor 202 of a second reward program 102 which is independent of the first reward program 101. The participants 204 each have an account with the first and second reward programs and the first program processor 201 receives from the second program processor 202 second currency. The first program processor 201 consolidates for redemption the second currency with the first currency for use by participants 204 via the first redemption module 210.

Referring again to FIG. 3, the following TABLE 3 illustrates the transactions that involve only the interface 200 in the exchange of information between the interface processor 200 and the second program processor 202 in order to concurrently redeem currencies in the first program 101 and the second program 201 in redemption transactions implemented by the first program 101. TABLE 3 illustrates the steps of TABLE 1 which only involve the interface. TABLE 3 illustrates the transfer of information in a redemption process from the perspective of the interface according to one embodiment of the invention.

TABLE 3

INFORMATION TRANSACTIONS FROM PERSPECTIVE OF THE
INTERFACE 200:

| STEP | SYSTEM(S) INVOLVED | ACTION(S) |
|---|---|---|
| 304 | PROGRAM #1 PROCESSOR 201 TO INTERFACE 200 | CALL IS INVOKED FROM PROGRAM #1 PROCESSOR 201 TO THE INTERFACE 200 TO RETRIEVE PARTICIPANT'S PROGRAM #2 POINT TOTAL FOR DISPLAY ON THE FIRST WEBSITE 201W |
| 306 | INTERFACE 200 TO PROGRAM #2 PROCESSOR 202 | INTERFACE 200 QUERIES PROGRAM #2 PROCESSOR 202 FOR PROGRAM #2 POINT TOTAL OF PARTICIPANT 204 IN BANK 208 |
| 308 | PROGRAM #2 PROCESSOR 202 TO INTERFACE 200 | PROGRAM #2 PROCESSOR 202 ADVISES INTERFACE 200 OF PROGRAM #2 POINT TOTAL OF PARTICIPANT 204 |
| 310 | INTERFACE 200 TO PROGRAM #1 PROCESSOR 201 | INTERFACE 200 PROVIDES PROGRAM #2 POINT TOTAL OF PARTICIPANT 204 TO PROGRAM #1 PROCESSOR 201 |
| 326 | PROGRAM #1 PROCESSOR 201 TO INTERFACE 200 | IF PROGRAM #2 POINTS NEEDED FOR REDEMPTION TRANSACTION, CALL IS INVOKED FROM PROGRAM #1 PROCESSOR 201 TO INTERFACE 200 TO DEDUCT PROGRAM #2 POINTS |
| 328 | INTERFACE 200 TO PROGRAM #2 PROCESSOR 202 | INTERFACE 200 INDICATES TO PROGRAM #2 PROCESSOR 202 PROGRAM #2 POINTS TO BE DEDUCTED |
| 332 | PROGRAM #2 PROCESSOR 202 TO INTERFACE 200 (OPTIONAL) | PROGRAM #2 PROCESSOR 202 INDICATES TO INTERFACE 200 THAT AMOUNT OF PROGRAM #2 POINTS HAS BEEN DEDUCTED FROM PROGRAM #2 POINTS |
| 334 | INTERFACE 200 TO PROGRAM #1 PROCESSOR 201 (OPTIONAL) | INTERFACE 200 INDICATES TO PROGRAM #1 PROCESSOR 201 THAT PROGRAM #2 POINTS HAVE BEEN DEDUCTED |

Referring again to FIG. 3, the following TABLE 4 illustrates the transactions that involve only the second program 202 in the exchange of information between the interface 200 and the second program 202 in order to consolidate for redemption currencies in the first program 201. TABLE 4 illustrates the steps of TABLE 1 which only involve program #2. TABLE 4 illustrates the transfer of information in a redemption process from the perspective of program #2 according to one embodiment of the invention.

TABLE 4

INFORMATION TRANSACTIONS FROM PERSPECTIVE OF
PROGRAM #2 PROCESSOR 202:

| STEP | SYSTEM(S) INVOLVED | ACTION(S) |
|---|---|---|
| 306 | INTERFACE 200 TO PROGRAM #2 PROCESSOR 202 | INTERFACE 200 QUERIES PROGRAM #2 PROCESSOR 202 FOR PROGRAM #2 POINT TOTAL OF PARTICIPANT 204 IN BANK 208 |
| 308 | PROGRAM #2 PROCESSOR 202 TO INTERFACE 200 | PROGRAM #2 PROCESSOR 202 ADVISES INTERFACE 200 OF PROGRAM #2 POINT TOTAL OF PARTICIPANT 204 |
| 328 | INTERFACE 200 TO PROGRAM #2 PROCESSOR 202 | INTERFACE 200 INDICATES TO PROGRAM #2 PROCESSOR 202 PROGRAM #2 POINTS TO BE DEDUCTED |
| 330 | PROGRAM #2 PROCESSOR 202 | PROGRAM #2 PROCESSOR 202 DEDUCTS AMOUNT OF PROGRAM #2 POINTS USED FOR REDEMPTION TRANSACTION |
| 332 | PROGRAM #2 PROCESSOR 202 TO INTERFACE 200 (OPTIONAL) | PROGRAM #2 PROCESSOR 202 INDICATES TO INTERFACE 200 THAT AMOUNT OF PROGRAM #2 POINTS HAS BEEN DEDUCTED FROM PROGRAM #2 POINTS |

Figure 4:
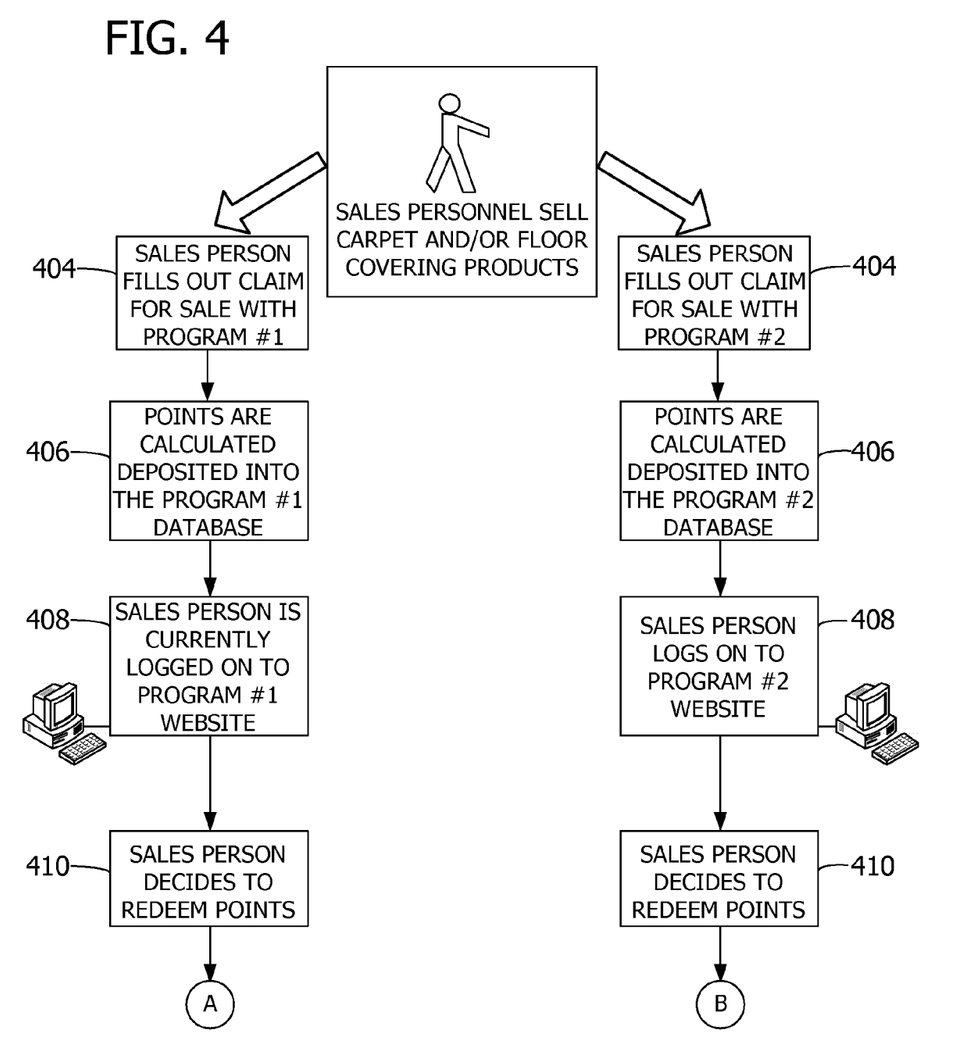
FIGS. 4 and 5 are flow charts illustrating a process according to one embodiment of the invention.
Figure 5:
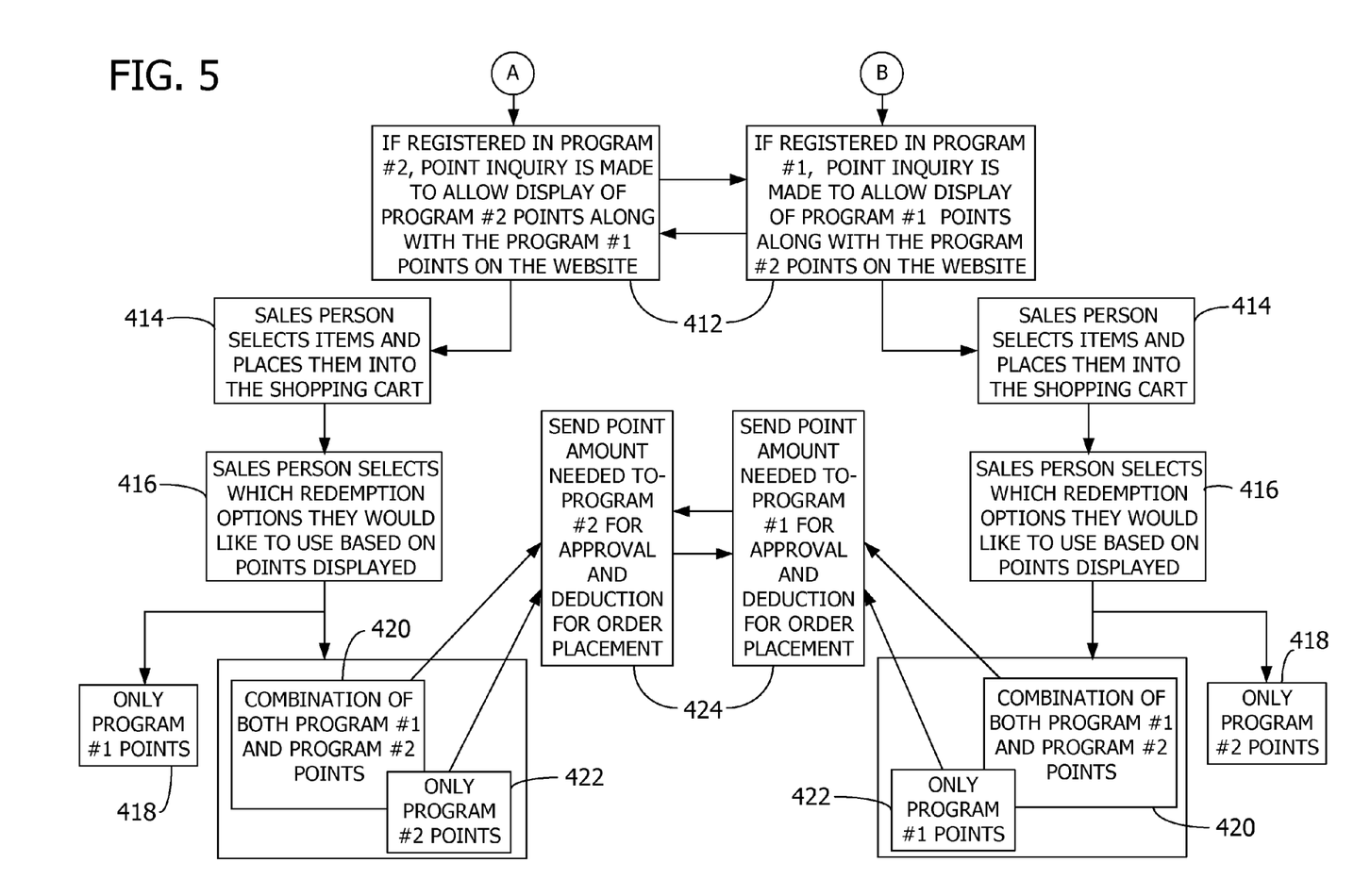

FIGS. 4 and 5 are flow charts illustrating a process according to one embodiment of the invention. In this embodiment, sales personnel 402 sell carpet and/or floor covering products from two different manufacturers, manufacture #1 and manufacturer #2. Manufacturer #1 has set up program #1 to provide awards the sales personnel 402 for their sales of products supplied by manufacturer #1. Manufacturer #2 has set up program #2 to provide awards the sales personnel 402 for their sales of products supplied by manufacturer #2. Manufacturers #1 and #2 have agreed to link their programs via an interface according to the invention so that sales personnel 402 may use in real time points from program #1 with points from program #2 to obtain awards.

Programs #1 and #2 operate in parallel and essentially in the same manner. After a qualified sale of product, the sales person submits at 404 to the program a claim for points for the sale. At 406, each program calculates and deposits the points for the sales person in the person's account in the program database. At 408, the sales person logs in to one of the programs and at 410 decides to redeem points. At 412, an inquiry is made to allow display of points from the other program so that points from both programs are displayed. At 414, the sales person selects items to be purchased with the points and places the selected items into the shopping card. At 416, the sales person selects which redemption options they would like to use based on the points displayed and the items in the shopping cart. The options are (1) at 418, points only from the program which the sales person logged in, (2) at 420, points from both programs and (3) at 422, only points from the other program. If option (1) is selected, the transaction is completed without any further interaction with the other program. If options (2) or (3) are selected, the transaction is completed by notifying the other program (for approval and deduction) of the points to be used from the other program.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, computers and/or servers may execute the computer-executable instructions such as those illustrated herein to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. An interface between at least three reward programs, including a first reward program having a first processor, a second reward program having a second processor and a third reward program having a third processor, wherein a participant has a first account of first currency in the first program, a second account of second currency in the second program and a third account of third currency in the third program, and wherein the participant is purchasing a reward item selected via the first reward program, the interface comprising:

An interface processor to link with and to communicate with the first processor, the second processor and the third processor, and to communicate with the participant via the first, second and third processors;

First Instructions executed by the interface processor to receive via the first processor of the first reward program a request from the participant of the second currency and the third currency to be applied to the purchase of the selected reward item via the first reward program;

Responsive to the First Instructions, Second Instructions executed by the interface processor to query the second processor of the second reward program to determine a total amount of the second currency in the second account of the participant and to query the third processor of the third reward program to determine a total amount of the third currency in the third account of the participant;

Responsive to the Second Instructions, Third Instructions executed by the interface processor to receive from the second processor of the second reward program the total amount of the second currency and to receive from the third processor of the third reward program the total amount of the third currency;

Responsive to the Third Instructions, Fourth Instructions executed by the interface processor to identify to the participant via the first processor of the first reward program the total amount of the second currency available to purchase the selected reward item selected by the participant via the first reward program and identifying to the participant via the first processor of the first reward program the total amount of the third currency available to purchase the selected reward item selected by the participant via the first reward program;

Responsive to the Fourth Instructions, Fifth Instructions executed by the interface processor to receive from the first processor of the first program a quantity of second currency indicated by the participant to be applied to purchase the selected reward item via the first reward program and to receive from the first processor of the first program a quantity of third currency indicated by the participant to be applied to purchase the selected reward item via the first reward program; and Responsive to the Fifth Instructions, Sixth Instructions executed by the interface processor to indicate to the second processor of the second reward program the quantity of second currency of the participant to be deducted from the second account of second currency of the participant in the second reward program and to indicate to the third processor of the third reward program the quantity of third currency of the participant to be deducted from the third account of third currency of the participant in the third reward program;

wherein a redemption module of the first program redeems the quantity of the second currency indicated by the participant to be applied to purchase the selected reward item and redeems the quantity of the third currency indicated by the participant to be applied to purchase the selected reward item, wherein the first, second and third currencies are redeemed concurrently in real time to purchase the selected reward item without the currencies being accumulated.

2. The interface of claim 1 further comprising in response to the redemption of the selected reward item:

Instructions executed by the interface processor to receive from the second processor of the second program an indication that the amount of second currency indicated by the participant has been deducted from the second program;

Instructions executed by the interface processor to indicate to the first processor of the first program that second program has indicated the amount of second currency has been deducted from the second program;

Instructions executed by the interface processor to receive from the third processor of the third program an indication that the amount of third currency indicated by the participant has been deducted from the third program; and Instructions executed by the interface processor to indicate to the first processor of the first program that third program has indicated the amount of third currency has been deducted from the third program.

3. A system of a reward and redemption program, the system comprising:

A first storage bank to store accounts of participants having a first currency in a first reward program;

A first redemption module having computer-executable instructions to redeem currency in exchange purchasing a reward item selected by a participant;

A first program processor having computer-executable instructions to administer the accounts in the first storage bank including adding first currency to the accounts and subtracting redeemed first currency in response to the first redemption module, A second storage bank to store accounts of participants having a second currency in a second reward program;

A second redemption module having computer-executable instructions to redeem currency in exchange to purchase a reward item selected by a participant;

A second program processor having computer-executable instructions to administer the accounts in the second storage bank including adding second currency to the accounts and subtracting redeemed second currency in response to the second redemption module, wherein the first program processor is linked to the second reward program processor of the second reward program which is independent of the first reward program, wherein particular participants each have an account with the first and second reward programs;

wherein the first program processor has computer-executable instructions to redeem the second currency with the first currency to use by particular participants of redemption via the first redemption module;

the system further comprising an interface an interface processor that interfaces with the first program processor and the second program processor and that interfaces with the participant only via one of the first program processor and the second program processor, said interface processor executing the following instructions:
   Instructions to receive from the first reward program a request of the participant of the second currency;
   Instructions to query the second reward program to determine a total amount of the second currency of the participant;
   Instructions to receive from the second reward program the total amount of the second currency;
   Instructions to identify to the participant via the first reward program the total amount of the second currency available to purchase a reward item selected by the participant via the first reward program;
   Instructions to receive from the first program a quantity of second currency indicated by the participant to be applied to purchase the selected reward item via the first redemption module of the first reward program;
   Instructions to indicate to the second reward program the quantity of second currency of the participant to be deducted from the amount of second currency of the participant in the second reward program; and
wherein the first redemption module redeems the quantity of second currency indicated by the participant to be applied to purchase the selected reward item, and
wherein the first and second currencies are redeemed concurrently in real time to purchase the selected reward item without the currencies being accumulated.

4. The system of claim 3, wherein in response to the redemption of the selected reward item the interface processor further executes:
   Instructions to receive from the second program an indication that the amount of second currency indicated by the participant has been deducted from the second program; and
   Instructions to indicate to the first program that second program has indicated the amount of second currency has been deducted from the second program.

5. A system of a reward and redemption program that use by participants, the system comprising:
   A first reward program system in which the participants are members, earning and redeeming first currency;
   A second reward program system independent and distinct from the first rewards program, wherein the second reward program in which the participants are members, earning and redeeming second currency;
   An interface processor interfacing with the first and second reward programs and interfacing with the participants of the first and second reward programs via processors of the first and second reward programs, the interface processor having computer-executable instruction to redeem a quantity of the second currency selected by a participant via the first reward program and to redeem a quantity of the first currency selected by the participant via the second reward program;
   wherein a first reward module redeems the quantity of second currency indicated by the participant to be applied to purchase a first selected reward item via the first reward program;
   wherein a second reward module redeems the quantity of first currency indicated by the participant to be applied to purchase a second selected reward item via the second reward program; and
   further comprising the following instructions executed by the interface processor:
      Instructions to receive from the first reward program a request of the participant of the second currency;
      Instructions to query the second reward program to determine a total amount of the second currency of the participant;
      Instructions to receive from the second reward program the total amount of the second currency;
      Instructions to identify to the participant via the first reward program the total amount of the second currency available to purchase a reward item selected by the participant via the first reward program;
      Instructions to receive from the first program a quantity of second currency indicated by the participant to be applied to purchase the selected reward item via the first reward program; and
      Instructions to indicate to the second reward program the quantity of second currency of the participant to be deducted from the amount of second currency of the participant in the second reward program.

6. The system of claim 5, wherein the interface comprises the following instructions executed by the processor:
   Instructions to receive from the second reward program a request of the participant for the first currency;
   Instructions to query the first reward program to determine a total amount of the first currency of the participant;
   Instructions to receive from the first reward program the total amount of the first currency;
   Instructions to identify to the participant via the second reward program the total amount of the first currency available for purchasing a reward item selected by the participant via the second reward program;
   Instructions to receive from the second program a quantity of first currency indicated by the participant to be applied to purchase the selected reward item via the second reward program; and
   Instructions to indicate to the first reward program the quantity of first currency of the participant to be deducted from the amount of first currency of the participant in the first reward program.

7. An interface processor which concurrently uses first currency of a first reward program and second currency of a second reward program, wherein the programs having a common participant, and wherein the interface processor comprises:

instructions executed by the interface processor to receive from the first reward program a request of the participant of the second currency;

instructions executed by the interface processor to Query the second reward program to determine the amount of the second currency of the participant;

instructions executed by the interface processor to receive from the second reward program the amount of the second currency;

instructions executed by the interface processor to identify to the participant via the first reward program the amount of the second currency available to purchase a reward item selected by the participant via the first reward program;

instructions executed by the interface processor to receive from the first program a quantity of second currency indicated by the participant to be applied to purchase the selected reward item via the first reward program;

instructions executed by the interface processor to indicate to the second reward program the quantity of second currency of the participant to be deducted from the amount of second currency of the participant in the second reward program;

instructions executed by the interface processor to redeem the quantity of second currency indicated by the participant to be applied to purchase the selected reward item via the first reward program; and wherein the second currency is redeemed concurrently in real time to purchase the selected reward item without the currencies being accumulated.

* * * * *